Patented Mar. 28, 1939

2,152,533

UNITED STATES PATENT OFFICE 2,152,533

HYDROGENATION OF RESINS

William H. Carmody, Pittsburgh, Pa., assignor to The Neville Company, a corporation of Pennsylvania No Drawing. Application August 6, 1936, Serial No. 94,637

10 Claims. (Cl. 260—32)

This invention relates to the hydrogenation of synthetic resins, and more specifically relates to procedure rendering the hydrogenation of those resins commercially feasible.

Utilizing Raney nickel catalyst as a hydrogenation catalyst, and hydrogenating resins in solution while agitating them with the catalyst, under conditions of moderate temperature and moderate hydrogen pressure, I have successfully hydrogenated the coumarone-type resins derived from crude solvent naphtha, the olefine and diolefine resins derived from petroleum, the pinene resins derived from turpentine, and dinaphthyl-methane resins. One result of hydrogenating all of these resins is the production of a colorless or approximately colorless resin having at least a greatly decreased tendency toward subsequent color development. The actual hydrogenating procedure of these resins is conducted upon a solution of the resins, and agitation of the resin solution with the catalyst is an element of fundamental importance in the procedure.

In effecting resin hydrogenation the use of an active hydrogenation catalyst is also a matter of fundamental importance, and the efficient catalysts of lowest price are the prepared nickel catalysts, of which Raney nickel may be taken as a preferred example. To define Raney nickel catalyst, it may be explained that this catalyst is prepared by grinding nickel aluminum alloy and dissolving the aluminum of the alloy in a caustic solution. The metallic nickel thus remains as a sponge powder, and as purified is used as a hydrogenation catalyst. Even the lowest priced catalyst which is efficient in effecting the hydrogenation of resins is of high cost, and its use constitutes the most important item of expense incident to the hydrogenation of the resins.

In my earlier work in the hydrogenation of resins, I followed the lead of Hermann Staudinger in his published disclosures as to the hydrogenation of polyindenes, and utilized prepared nickel catalyst in a weight approximately equal to 50% the weight of the resin. Under most operating conditions an approximation to such relatively great quantity of catalyst remains necessary.

It has been stated above that it is of fundamental importance in the hydrogenation of resins that the resin be agitated with the catalyst during the progress of hydrogenation. In following the simplest procedure, a resin solution is introduced into a vessel arranged for rocking or tumbling movement, or equipped with a propeller or stirrer. The agitation during hydrogenation serves both to maintain the catalyst in suspension in the resin solution, and serves also to distribute the hydrogen in the solution.

Such vessel and the catalyst-containing resin solution in it are raised to a moderately elevated temperature, such, for example, as 200° C., prior to the introduction of hydrogen. Since the pressure-resisting vessels so used are of relatively great mass, a substantial length of time is occupied in raising the temperature of the material and vessel to that point.

I have observed and utilized a peculiar effect resultant from introducing the resin into the hydrogenating vessel in solid state, together with the solvent for the resin, and agitating the resin and the catalyst together while the temperature of the vessel and its contents are raised to a point suitable for hydrogenation, and the resin becomes dissolved in the solvent. If this procedure is followed, I have found that in hydrogenating the resin a weight of the nickel catalyst less than 10% the weight of the resin may be effectively employed with hydrogen pressures of less than 1000 pounds, and that in fact the optimum quantity of catalyst is no more than 4% or 5% the weight of the resin.

In accounting for this phenomenon, I have further discovered that the reason for the favorable results obtained by use of a minimized quantity of catalyst is to be found in the fact that the catalyst particles have acquired by agitation in the presence of the solid resin an electrical charge of such nature that the catalyst particles tend to repel each other. In the solution, therefore, the particles of catalyst so charged become throughout spaced from each other a uniform distance, and that there is no tendency for the catalyst particles to settle from the solution. The catalyzed solution is thus in such condition that all portions of it are supplied effectively with catalyst by means of a minimized quantity of catalysts. In fact the effect of the electrical charge is so striking that if the resin solution be withdrawn from the hydrogenating vessel and permitted to stand, no appreciable settling of the catalyst particles from suspension in the solution takes place within a period of approximately 24 hours.

It seems clear that the electrical charge is acquired by catalyst particles from the solid resin, and originates in the agitation of the solid particles of resin. For this reason I have found it desirable to utilize as a solvent for the resin an organic liquid in which the resin is not too readily soluble. For example, petroleum benzene is for this process an ideal solvent, since it is a poor solvent for all of the resins above named, the coumarone resins being wholly insoluble in it at normal room temperature. By using a solvent of that nature, the resin is not rapidly taken into solution, but remains in solid state throughout a substantial period of heating and agitation, and thus has increased opportunity to acquire and to impart to the catalyst particles an electrical charge. It is desirable that the solid resin be crushed prior to its introduction into the hydrogenator. The operation of crushing in itself generates an initial electrical charge on the resin, and the division of the resin into an increased number of particles gives the resin increased surface area, so that the electrical effect is emphasized by increasing the area on which the pieces of resin rub each other during the preparatory agitation of the charge. An even more vigorous charge may be obtained by initially charging resin (either crushed or in fairly large lumps) into the hydrogenator with the catalyst, but initially without solvent. Under such conditions, the full charge of resin, either by crushing under agitation or merely by rubbing between crushed particles under agitation, may be utilized to generate the electrical charge, and transfer it to the catalyst, before any of the resin is removed from electrical activity in a subsequently introduced solvent.

To give a complete typical example of hydrogenation utilizing the preparatory steps above noted, I have hydrogenated coumarone resin in the following manner:

After preparing a catalyzed solution of coumarone resin in a hydrogenating vessel in the manner above described, which solution contained Raney nickel catalyst in a weight equal to 4% the weight of the resin, I introduced hydrogen. While maintaining the hydrogenator and its contents at a temperature of about 200° C., and while agitating the contents of the hydrogenator, I established and maintained in the resin solution a hydrogen pressure of about 875 pounds for a period of about 5 hours. By this procedure the resin was rendered colorless, and its precipitation point from Stoddard solvent naphtha was lowered from between 59° C. to 56° C. to below —63° C. The small quantity of catalyst employed is a striking feature of the process.

If in actual hydrogenation it is desired to obtain agitation of the catalyzed resin solution and the hydrogen by means of circulation, rather than by agitating a vessel containing the resin solution and the catalyst, or by stirring the resin solution during hydrogenation, the resin may be brought into solution in association with the catalyst in a vessel formed or equipped for mechanical agitation, and, after the solution has been made and the catalyst electrically charged, the resin may be introduced into the circulatory hydrogenator.

In order to illustrate the commercial importance of my invention by specific example, I shall give the specific instance of coumarone resin. In hydrogenating that resin, the hydrogen introduced into each molecule of the resin (assuming that hydrogenation be complete) is approximately 4.7% the weight of the resin. To effect a 100% hydrogen saturation of the resin, 10 cubic feet of hydrogen for each pound of resin is adequate, and the cost of that quantity of hydrogen of highest grade at normal commercial prices is relatively small. The cost of $1/20$ pound of Raney nickel catalyst (the least expensive efficient catalyst) is substantial, and the catalyst cannot, even with care, be used in effecting hydrogenation more than 2 or 3 times. If the catalyst be used in a weight equal to 50% of the resin, the cost of the catalyst becomes the major expense in hydrogenating resin.

Increasing catalyst effectiveness, and thereby rendering adequate radically reduced catalyst quantity, is of great value in even the most moderate resin hydrogenations, which are those in which the resin is hydrogen-modified only to the extent necessary to decolorize it. In conducting resin hydrogenation to effect change in the solubility nature of coumarone resin, as disclosed in my copending application Serial No. 94,636, filed August 6, 1936, it is of primary importance that the charge of catalyst used be highly effective. In connection with such general process, therefore, my specialized preparatory steps, by which the effectiveness of the catalyst is radically increased, become of such great importance that they may be considered as bringing the hydrogen-modified resin within a manufacturing cost range permitting its sale in the medium price range in which most of the phenol-formaldehyde resins, glyptal resins, and the like are sold.

While the sponge nickel hydrogenation catalyst combines relatively high efficiency with relatively low cost, other metals, in the form of sponge powders, may be used for hydrogenating synthetic resins. Thus copper while less efficient than nickel may be used, and platinum while of high cost is a catalyst even more efficient than nickel. The effectiveness of these, and the other metals usable catalytically to promote the hydrogenation of synthetic resins, is increased by imparting to them a similar electrical charge, as by employment of the procedure preparatory to hydrogenation above disclosed and explained.

I claim as my invention:

1. In the catalytic hydrogenation of hard normally solid synthetic resin in solution, that preparatory step which comprises agitating the solid resin in contact with finely divided metallic hydrogenation catalyst and thereby charging the catalyst particles electrically so that upon solution of the resin in solvent the catalyst is efficiently suspended substantially uniformly throughout the resultant solution.

2. In the catalytic hydrogenation of hard normally solid synthetic resin in solution, that preparatory step which comprises agitating the solid resin in finely divided condition in contact with finely divided metalic hydrogenation catalyst and thereby charging the catalyst particles electrically so that upon solution of the resin in solvent the catalyst is efficiently suspended substantially uniformly throughout the resultant solution.

3. A method according to claim 2 in which said catalyst is metallic nickel.

4. In the catalytic hydrogenation of hard normally solid synthetic resin, that preparatory step which comprises agitating the solid resin in contact with finely divided metallic hydrogenation catalyst, and effecting solution of the resin in a liquid solvent, whereby there is provided a solution of said resin in which the catalyst is efficiently suspended substantially uniformly throughout.

5. A method according to claim 4 in which said resin is initially finely divided, and in which said catalyst is metallic nickel.

6. In the catalytic hydrogenation of hard normally solid synthetic resin, that combination of preparatory steps which comprises agitating the resin in finely divided solid form in contact with finely divided metallic hydrogenation catalyst and in the presence of a solvent for said resin, and thereby producing a solution of said resin in which said catalyst is efficiently suspended substantially uniformly throughout.

7. A method according to claim 6 in which said solvent possesses low solvent power for said resin.

8. A method according to claim 6 in which said catalyst is metallic nickel.

9. A method according to claim 1, said resin being coumarone resin, and said catalyst being metallic nickel.

10. A method according to claim 6, said resin being coumarone resin, and said catalyst being metallic nickel.

WILLIAM H. CARMODY.